No. 743,149. PATENTED NOV. 3, 1903.
G. E. COLLINS.
EGG BEATER.
APPLICATION FILED AUG. 7, 1903.
NO MODEL.
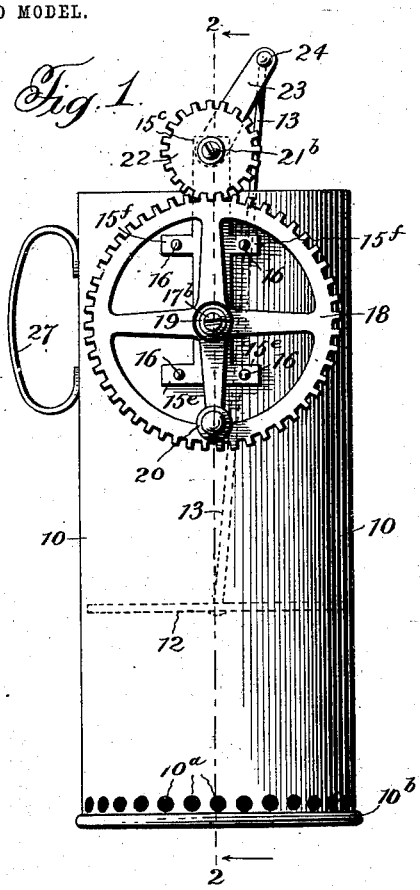
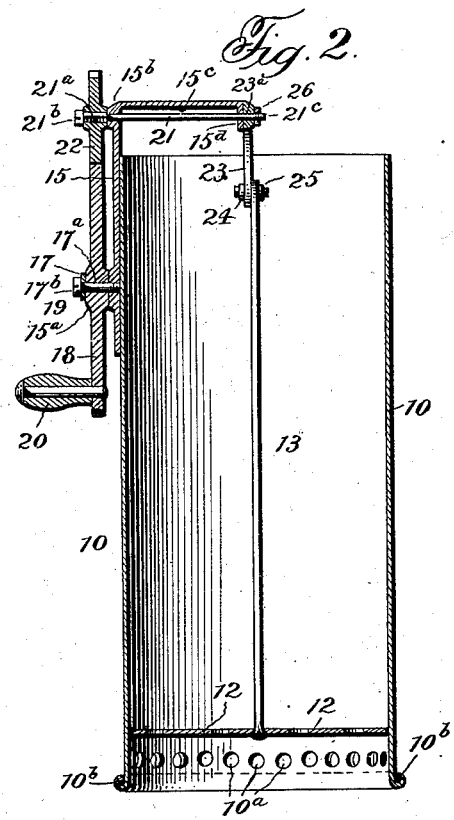
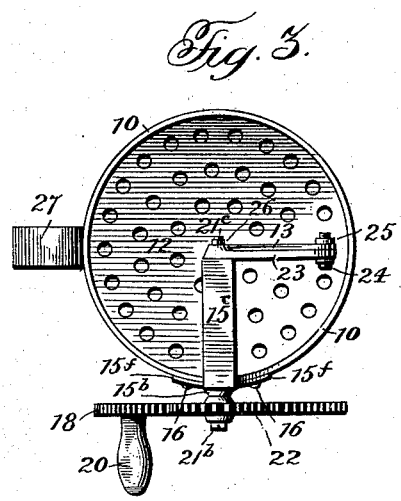
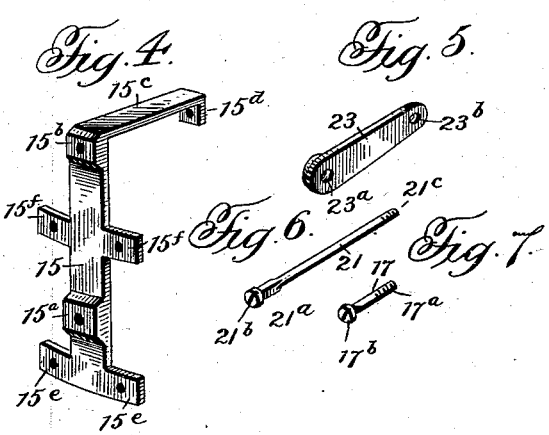
Witnesses.
Jas. E. Hutchinson
K. W. O'Real
Inventor:
George E. Collins,
By Walter Allen
Attorney No. 743,149. Patented November 3, 1903.

UNITED STATES PATENT OFFICE.

GEORGE E. COLLINS, OF ATKINSON, NEBRASKA.

EGG-BEATER.

SPECIFICATION forming part of Letters Patent No. 743,149, dated November 3, 1903.

Application filed August 7, 1903. Serial No. 168,611. (No model.)

*To all whom it may concern:*

Be it known that I, GEORGE E. COLLINS, a citizen of the United States of America, and a resident of Atkinson, in the county of Holt and State of Nebraska, but formerly a resident of Colon, in the county of Saunders, in said State, have invented certain new and useful Improvements in Egg-Beaters, of which the following is a specification.

My invention is an improvement in that class of egg-beaters which comprise a cylindrical body or cylinder, a single reciprocating perforated dasher-plate, and mechanism for operating the dasher-plate.

One object of my invention is to provide a rigid bracket or frame of peculiar construction for supporting the operating mechanism from the side of the body or cylinder.

Another object of my invention is to provide a simple and compact operating mechanism for reciprocating the dasher-plate.

In order that my invention may be fully understood, I will proceed to describe it with reference to the accompanying drawings, in which—

Figure 1 is a front view of my improved egg-beater, the dasher-plate being raised. Fig. 2 is a vertical section thereof, taken on the line 2 2 of Fig. 1, the dasher-plate being lowered. Fig. 3 is a top view of the device. Fig. 4 is a perspective view of the bracket or frame for supporting the operating mechanism. Fig. 5 is a perspective view of the crank-arm which I employ for connecting the driving-shaft with the dasher-rod. Fig. 6 is a perspective view of the driving-shaft. Fig. 7 is a perspective view of the pin or stud providing an arbor on which the main gear-wheel is mounted.

10 represents a cylindrical body or cylinder made of any suitable material and having a row of holes or perforations $10^a$ in the wall thereof surrounding and contiguous to the lower end thereof. The body or cylinder is also formed with a peripheral rolled rim $10^b$ at the bottom, providing a base for the body or cylinder. Within the body or cylinder is a perforated dasher-plate 12, which is lowered to force the eggs through the row of holes or perforations into the vessel and then raised to draw the eggs back again within the body or cylinder by suction through the row of holes or perforations, thus thoroughly beating the contents by alternately passing the egg substance through the holes or perforations. This dasher-plate is provided with a dasher-rod 13, rigidly secured thereto, so as to keep the dasher-plate in horizontal position.

My bracket or frame for supporting the dasher-plate-operating mechanism is approximately of right-angle shape and is constructed or cast with a vertical body part 15, having a lower perforated boss $15^a$, an upper perforated boss providing an inner shaft-bearing $15^b$, and an overhanging arm $15^c$, having a perforated depending lip $15^d$, providing an outer shaft-bearing. This bracket or frame is also constructed or cast with laterally-extending perforated lower lugs $15^e$ and laterally-extending perforated upper lugs $15^f$, receiving rivets 16, whereby the bracket or frame is rigidly secured to one side of the body or cylinder.

17 is a pin or stud having a screw-threaded inner end $17^a$, whereby it is secured in the interiorly-screw-threaded perforation of the lower boss $15^a$ of the bracket or frame and providing an arbor on which I mount a large gear-wheel 18. The pin or stud 17 is also provided with a retaining head or nut $17^b$ and a washer 19 for holding the large gear-wheel in place. The large gear-wheel 18 is provided with an operating-handle 20 for rotating it.

21 is a driving-shaft mounted in the shaft-bearing of the bracket or frame 15, having its outer end formed with a squared neck or shank $21^a$ and a retaining-head $21^b$ and its inner end $21^c$ screw-threaded and projecting beyond the outer shaft-bearing. Mounted on the square neck or shank $21^a$ of the driving-shaft is a small gear-wheel 22, surmounting and meshed by the large gear-wheel 18.

23 is a crank-arm having an interiorly-screw-threaded perforation $23^a$ at its inner end, whereby it is fixed to the projecting end $21^c$ of the driving-shaft, and a plain perforation $23^b$ at its outer end, receiving a headed coupling-pin 24, whereby it is connected with the perforated upper end of the dasher-rod 13. The coupling-pin 24 is secured by a nut 25. For retaining the crank-arm 23 on the driving-shaft I employ a nut 26.

27 is a bow handle secured to the body or cylinder for holding the latter in position with one hand, while the handle of the large gear-wheel 18 is grasped by the other hand for operating the mechanism of the beater.

It will be readily seen that the different parts of the operating mechanism can be quickly taken apart for cleaning and replaced without difficulty.

In use the beater is stood in a suitable vessel with the lower end of the body or cylinder surrounding the eggs to be beaten, and as soon as the device is operated the eggs will pass through the perforated dasher-plate and back and forth through the dasher-plate and through the row of holes or perforations in the body or cylinder and between the dasher-plate and the vessel.

Having thus described my invention, the following is what I claim as new therein and desire to secure by Letters Patent:

1. An egg-beater comprising a body, a bracket, supporting the operating mechanism, formed with a body part having an inner shaft-bearing, and an overhanging arm, having an outer shaft-bearing, means securing the body part of the bracket to the side of the beater-body, a driving-shaft mounted in the shaft-bearings, an arbor secured to the body part of the bracket beneath the upper end of the beater-body, a large gear-wheel having an operating-handle and mounted on the arbor, a small gear-wheel fixed to the inner end of the driving-shaft and meshed by the large gear-wheel, a crank-arm fixed to the outer end of the driving-shaft, a perforated dasher-plate and a dasher-rod connecting the dasher-plate with the crank-arm.

2. An egg-beater comprising a body having a row of perforations around and contiguous to the lower end of the body, a bracket, supporting the operating mechanism formed with a body part having an inner shaft-bearing, and an overhanging arm, having an outer shaft-bearing, means securing the body part of the bracket to the side of the beater-body, a driving-shaft mounted in the shaft-bearings, an arbor secured to the body part of the bracket beneath the upper end of the beater-body, a large gear-wheel having an operating-handle and mounted on the arbor, a small gear-wheel fixed to the inner end of the driving-shaft and meshed by the large gear-wheel, a crank-arm fixed to the outer end of the driving-shaft, a perforated dasher-plate and a dasher-rod connecting the dasher-plate with the crank-arm.

3. An egg-beater comprising a body, a bracket, supporting the operating mechanism, formed with a body part having laterally-extending lower lugs, laterally-extending upper lugs, an inner shaft-bearing, and an overhanging arm having an outer shaft-bearing, rivets whereby the bracket is secured by its lower and upper lugs to the side of the body, a driving-shaft mounted in the shaft-bearings, an arbor secured to the body part of the bracket, a large gear-wheel having an operating-handle and mounted on the arbor, a small gear-wheel fixed to the inner end of the driving-shaft, and meshed by the large gear-wheel, a crank-arm fixed to the outer end of the driving-shaft, a perforated dasher-plate, and a dasher-rod connecting the dasher-plate with the crank-arm.

4. An egg-beater comprising a body, a bracket, supporting the operating mechanism, formed with a body part having a screw-threaded perforation, an inner shaft-bearing and an overhanging arm having an outer shaft-bearing, means for securing the bracket to the side of the body, a driving-shaft mounted in the shaft-bearings, a pin providing an arbor and having a screw-threaded inner end secured in the screw-threaded perforation of the body part, a large gear-wheel mounted on the pin, a small gear-wheel fixed to the inner end of the driving-shaft and meshed by the large gear-wheel, a crank-arm fixed to the outer end of the driving-shaft, a perforated dasher-plate, and a dasher-rod connecting the dasher-plate with the crank-arm.

5. An egg-beater comprising a body, a bracket, supporting the operating mechanism, formed with a body part having an inner shaft-bearing and an overhanging arm having an outer shaft-bearing, means for securing the bracket to the side of the body, a driving-shaft mounted in the shaft-bearings and having a squared neck at its inner end and a projecting screw-threaded outer end, an arbor secured to the body part of the bracket, a large gear-wheel mounted on the arbor, a small gear-wheel fixed to the square neck, and meshed by the large gear-wheel, a crank-arm having a screw-threaded perforation at its inner end whereby it is secured to the outer end of the driving-shaft, a dasher-plate, and a dasher-rod connecting the dasher-plate with the crank-arm.

6. An egg-beater comprising a body, a bracket, supporting the operating mechanism, formed with a body part having a lower boss, a perforated upper boss, providing an inner shaft-bearing, and an overhanging arm having a perforated depending lip providing an outer shaft-bearing, a driving-shaft mounted in the upper boss and depending lip, an arbor secured to the body part of the bracket, a large gear-wheel having an operating-handle and mounted on the arbor, a small gear-wheel fixed to the inner end of the driving-shaft and meshed by the large gear-wheel, a crank-arm fixed to the outer end of the driving-shaft, a perforated dasher-plate, and a dasher-rod connecting the dasher-plate with the crank-arm.

7. An egg-beater comprising a body, a bracket, supporting the operating mechanism, formed with a body part having laterally-extending lower and upper lugs, a screw-threaded perforation, an inner shaft-bearing and an overhanging arm having an outer shaft-bearing, means whereby the bracket is secured by its lower and upper lugs to the side of the body, a driving-shaft mounted in the shaft-bearings, and having a squared neck at its inner end and a projecting screw-threaded outer end, a pin providing an arbor and having a screw-threaded inner end secured in the screw-threaded perforation of the body part, a large gear-wheel mounted on the pin, a small gear-wheel fixed to the squared neck, and meshed by the large gear-wheel, a crank-arm having a screw-threaded perforation at its inner end whereby it is secured to the outer end of the driving-shaft, a dasher-plate, and a dasher-rod connecting the dasher-plate with the crank-arm.

GEORGE E. COLLINS.

Witnesses:
A. L. MOUNTAIN,
LETTIE COLLINS.